United States Patent
Gao et al.

(10) Patent No.: US 11,324,029 B2
(45) Date of Patent: May 3, 2022

(54) DATA TRANSMISSION METHOD, TERMINAL AND BASE STATION

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 88 days.

(21) Appl. No.: 16/476,539

(22) PCT Filed: Feb. 7, 2018

(86) PCT No.: PCT/CN2018/075578
§ 371 (c)(1),
(2) Date: Jul. 8, 2019

(87) PCT Pub. No.: WO2018/127229
PCT Pub. Date: Jul. 12, 2018

(65) Prior Publication Data
US 2020/0404694 A1 Dec. 24, 2020

(30) Foreign Application Priority Data
Jan. 6, 2017 (CN) .......................... 201710010179.2

(51) Int. Cl.
*H04W 72/14* (2009.01)
*H04W 72/12* (2009.01)

(52) U.S. Cl.
CPC ... *H04W 72/1289* (2013.01); *H04W 72/1268* (2013.01)

(58) Field of Classification Search
CPC ......... H04W 72/1289; H04W 72/1268; H04W 72/042; H04W 72/0446; H04L 1/00; H04L 5/00
See application file for complete search history.

(56) References Cited

U.S. PATENT DOCUMENTS

2013/0058306 A1   3/2013   Noh et al.
2013/0114419 A1   5/2013   Chen et al.
(Continued)

FOREIGN PATENT DOCUMENTS

CN   102695276 A   9/2012
CN   102939731 A   2/2013
(Continued)

OTHER PUBLICATIONS

First Office Action and search report from CN app. no. 201710010179. 2, dated Dec. 11, 2019, with English translation from Global Dossier.

(Continued)

*Primary Examiner* — Asad M Nawaz
*Assistant Examiner* — Zhaohui Yang
(74) *Attorney, Agent, or Firm* — Ladas & Parry, LLP

(57) ABSTRACT

A data transmission method, a terminal and a base station are provided. The method includes: receiving a downlink control channel, and indication information for indicating a division of uplink resources and downlink resources in a time unit; determining uplink resources and/or downlink resources in a target time unit corresponding to the downlink control channel, according to the indication information, where the target time unit is the time unit in which a target transmission corresponding to the downlink control channel is located; and determining time field resources of the target transmission corresponding to the downlink control channel in the uplink resources or the downlink resources, and (Continued)

performing the target transmission in the time field resources.

23 Claims, 4 Drawing Sheets

(56) References Cited

U.S. PATENT DOCUMENTS

| | | | |
|---|---|---|---|
| 2013/0315113 A1 | 11/2013 | Seo et al. | |
| 2014/0036853 A1 | 2/2014 | Kim et al. | |
| 2014/0105076 A1 | 4/2014 | Yang et al. | |
| 2014/0112289 A1 | 4/2014 | Kim et al. | |
| 2015/0036563 A1 | 2/2015 | Hurd et al. | |
| 2015/0264678 A1* | 9/2015 | Yin | H04L 1/1854 370/329 |
| 2017/0347268 A1 | 11/2017 | Chen et al. | |
| 2018/0145796 A1 | 5/2018 | Liang et al. | |
| 2018/0220407 A1* | 8/2018 | Xiong | H04L 5/0035 |
| 2020/0120663 A1* | 4/2020 | Parkvall | H04L 1/1854 |

FOREIGN PATENT DOCUMENTS

| | | |
|---|---|---|
| CN | 103944665 A | 7/2014 |
| CN | 106301670 A | 1/2017 |
| CN | 103650393 A | 3/2019 |
| WO | WO 2013/006006 A2 | 1/2013 |

OTHER PUBLICATIONS

First Office Action from TW app. no. 107104459, dated Feb. 14, 2019, with machine English translation.
International Preliminary Report on Patentability from PCT/CN2018/075578, dated Jul. 9, 2019, with English translation from WIPO.
"NR scheduling procedure", R1-1608795, 3GPP TSG RAN WG1 Meeting #86bis, Lisbon, Portugal, Oct. 10-14, 2016.
Written Opinion of the International Searching Authority for PCT/CN2018/075578 dated Apr. 28, 2018 and its English translation provided by WIPO.
International Search Report for PCT/CN2018/075578 dated Apr. 28, 2018 and its English translation provided by WIPO.
"NR scheduling procedure," 3GPP TSG RAN WG1 Meeting #86bis, Oct. 10-14, 2016.
"NR UL control channel structure," 3GPP TSG RAN WG1 Meeting #87, Nov. 14-18, 2016.

* cited by examiner

DATA TRANSMISSION METHOD, TERMINAL AND BASE STATION

CROSS-REFERENCE TO RELATED APPLICATIONS

This application is the U.S. national phase of PCT/CN2018/075578 filed on Feb. 7, 2018 which claims a priority to Chinese Patent Application No. 201710010179.2 filed in China on Jan. 6, 2017, the disclosures of which are incorporated by reference herein in their entireties.

TECHNICAL FIELD

The present disclosure relates to the technical field of communications, and in particular to a data transmission method, a terminal and a base station.

BACKGROUND

With the development and change of demands for mobile communication services, organizations such as the International Telecommunication Union (ITU) and the 3GPP have begun to conduct research on new wireless communication systems (such as 5G systems). The new wireless communication system can support a coexistence of multiple service types, such as an Enhanced Mobile Broadband (eMBB) service, an Ultra Reliable and Low Latency Communication (URLLC) service and a Massive Machine-Type of Communication (mMTC). In addition, the traffics of the same type of service may also change. In order to support different service types and flexible and variable traffics, a transmission structure, such as a full downlink slot, a full uplink slot, a part of downlink slots and a part of uplink slots, may be adopted. The part of downlink slots and the part of uplink slots may further include a downlink-dominant slot and an uplink-dominant slot. Currently, there is no solution for transmission in a variable slot structure.

SUMMARY

The present disclosure aims to provide a data transmission method, a terminal and a base station, with the purpose of solving the problem of realizing transmission in a variable slot structure which is not addressed in the related art.

In order to solve the above technical problem, a data transmission method is provided according to an embodiment of the present disclosure. The method includes:

receiving a downlink control channel, and indication information for indicating a division of uplink resources and downlink resources in a time unit;

determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources.

The receiving the indication information for indicating the division of uplink resources and downlink resources in the time unit includes:

receiving the indication information through a high layer signaling, a broadcast signal, or a downlink control channel.

The receiving the indication information for the indicating the division of uplink resources and downlink resources in the time unit includes:

receiving the indication information in the target time unit corresponding to the downlink control channel or in a time unit previous to the target time unit.

Specifically, the target transmission corresponding to the downlink control channel includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

The target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The determining the time field resources of the target transmission corresponding to the downlink control channel in the uplink resources or the downlink resources includes:

taking all symbols or all mini-slots, or all slots or all sub-frames, or a part of symbols or a part of mini-slots, or a part of slots or a part of sub-frames, in the uplink resources or the downlink resources, as the time field resource of the target transmission; or taking all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1.

The determining the time field resources of the target transmission corresponding to the downlink control channel in the uplink resources or the downlink resources includes:

in a case that an indication field for indicating time field resources of the target transmission exists in the downlink control channel, determining the time field resources of the target transmission in the uplink resources or the downlink resources according to the indication field and the indication information.

The determining the time field resources of the target transmission in the uplink resources or the downlink resources according to the indication field and the indication information includes:

in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, taking the time field resources indicated by the indication field as time field resources of the target transmission; or in a case that the time field resources indicated by the indication field exceed a size of the uplink resources or the downlink resources determined according to the indication information, taking the uplink resources or the downlink resources as time field resources of the target transmission, or taking time field resources indicated by the indication field as time field resources of the target transmission, or taking a maximum value or a minimum value of time field resources indicated by the indication field and the time field resources indicated by the uplink resources or the downlink resources as time field resources of the target transmission; or in a case that the time field resources indicated by the indication field exceed a size of an area pre-agreed or pre-configured for data transmission in the uplink resources or the downlink resources which are determined according to the indication information, taking the area pre-agreed or pre-configured for data transmission in the uplink resources or the downlink resources as time field resource of the target transmission, or taking time field resources indicated by the indication field as time field resources of the target transmission, or taking a maximum value or a minimum value of the time field resources indicated by the indication field and the time field resources indicated by the area pre-agreed or pre-configured for data transmission in the uplink resources or the downlink resources as time field resource of the target transmission.

The indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

The structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

The time unit and the target time unit each is a pre-defined or pre-configured unit including D1 sub-frames, D2 slots, D3 mini-slots and D4 symbols, wherein D1, D2, D3 and D4 are integers greater than or equal to 1.

The above data transmission method further includes:

in a case that the indication information is not received or the indication information fails to be received, determining not to perform the target transmission in the target time unit, or determining to perform the target transmission in the target time unit according to a size and/or a location of pre-defined or pre-configured time field resource; or, in a case that an indication field for indicating time field resources of the target transmission exists in the downlink control channel, determining to perform the target transmission in the target time unit according to the time field resources indicated by the indication field.

A data transmission method applied to a base station is further provided according to an embodiment of the present disclosure. The method includes:

transmitting a downlink control channel, and indication information for indicating a division of uplink resources and downlink resources in a time unit;

determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources.

The transmitting the indication information for indicating the division of uplink resources and downlink resources in the time unit includes:

transmitting the indication information through a high layer signaling, a broadcast signal, or the downlink control channel.

The transmitting the indication information for the indicating the division of uplink resources and downlink resources in the time unit includes:

transmitting the indication information in the target time unit corresponding to the downlink control channel or in a time unit previous to the target time unit.

Specifically, the target transmission corresponding to the downlink control channel includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

The target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The determining the time field resources of the target transmission corresponding to the downlink control channel in the uplink resources or the downlink resources includes:

taking all symbols or all mini-slots, or all slots or all sub-frames, or a part of symbols or a part of mini-slots, or a part of slots or a part of sub-frames, in the uplink resources or the downlink resources, as the time field resource of the target transmission; or taking all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1.

The determining the time field resources of the target transmission corresponding to the downlink control channel in the uplink resources or the downlink resources includes:

in a case that an indication field for indicating time field resources of the target transmission exists in the downlink control channel, determining the time field resources of the target transmission in the uplink resources or the downlink resources according to the indication field and the indication information.

The determining the time field resources of the target transmission in the uplink resources or the downlink resources according to the indication field and the indication information includes:

in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, taking the time field resources indicated by the indication field as time field resources of the target transmission; or in a case that the time field resources indicated by the indication field exceed a size of the uplink resources or the downlink resources determined according to the indication information, taking the uplink resources or the downlink resources as time field resources of the target transmission, or taking time field resources indicated by the indication field as time field resources of the target transmission, or taking a maximum value or a minimum value of time field resources indicated by the indication field and the time field resources indicated by the uplink resources or the downlink resources as time field resources of the target transmission; or in a case that the time field resources indicated by the indication field exceed a size of an area pre-agreed or pre-configured for data transmission in the uplink resources or the downlink resources which are determined according to the indication information, taking the area pre-agreed or pre-configured for data transmission in the uplink resources or the downlink resources as time field resources of the target transmission, or taking time field resources indicated by the indication field as time field resources of the target transmission, or taking a maximum value or a minimum value of the time field resources indicated by the indication field and the time field resources indicated by the area pre-agreed or pre-configured for data transmission in the uplink resources or the downlink resources as time field resources of the target transmission.

The indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

The structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

The time unit and the target time unit each is a pre-defined or pre-configured unit including D1 sub-frames, D2 slots, D3 mini-slots and D4 symbols, wherein D1, D2, D3 and D4 are integers greater than or equal to 1.

The above data transmission method further includes:

in a case that the indication information is not received or the indication information fails to be received, determining not to perform the target transmission in the target time unit, or determining to perform the target transmission in the target time unit according to a size and/or a location of pre-defined or pre-configured time field resource; or, in a case that an indication field for indicating time field resources of the target transmission exists in the downlink control channel, determining to perform the target transmission in the target time unit according to the time field resources indicated by the indication field.

A terminal is further provided according to an embodiment of the present disclosure. The terminal includes:

a receiving module, configured to receive a downlink control channel, and indication information for indicating a division of uplink resources and downlink resources in a time unit;

a first determining module, configured to determine uplink resources and/or downlink resources in a target time unit corresponding to the downlink control channel, according to the indication information, wherein the target time unit is the time unit in which a target transmission corresponding to the downlink control channel is located; and a second determining module, configured to determine time field resources of the target transmission corresponding to the downlink control channel in the uplink resources or the downlink resources, and perform the target transmission in the time field resources.

Specifically, the receiving module is configured to receive the indication information through a high layer signaling, a broadcast signal, or a downlink control channel.

Specifically, the receiving module is configured to receive the indication information in the target time unit corresponding to the downlink control channel or in a time unit previous to the target time unit.

Specifically, the target transmission corresponding to the downlink control channel includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

The target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The second determining module includes:

a first determining sub-module, configured to take all symbols or all mini-slots, or all slots or all sub-frames, or a part of symbols or a part of mini-slots, or a part of slots or a part of sub-frames, in the uplink resources or the downlink resources, as the time field resource of the target transmission; or a second determining sub-module, configured to take all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1.

The second determining module includes:

a third determining sub-module configured to: in a case that an indication field for indicating time field resources of the target transmission exists in the downlink control channel, determine the time field resources of the target transmission in the uplink resources or the downlink resources according to the indication field and the indication information.

The third determining sub-module includes:

a first determining unit configured to: in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, take the time field resources indicated by the indication field as time field resources of the target transmission;

a second determining unit configured to: in a case that the time field resources indicated by the indication field exceed a size of the uplink resources or the downlink resources determined according to the indication information, take the uplink resources or the downlink resources as time field resources of the target transmission, or take time field resources indicated by the indication field as time field resources of the target transmission, or take a maximum value or a minimum value of time field resources indicated by the indication field and the time field resources indicated by the uplink resources or the downlink resources as time field resources of the target transmission; and a third determining unit configured to: in a case that the time field resources indicated by the indication field exceed a size of an area pre-agreed or pre-configured for data transmission in the uplink resources or the downlink resources which are determined according to the indication information, take the area pre-agreed or pre-configured for data transmission in the uplink resources or the downlink resources as time field resources of the target transmission, or take time field resources indicated by the indication field as time field resources of the target transmission, or take a maximum value or a minimum value of the time field resources indicated by the indication field and the time field resources indicated by the area pre-agreed or pre-configured for data transmission in the uplink resources or the downlink resources as time field resources of the target transmission.

The indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

The structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

The time unit and the target time unit each is a pre-defined or pre-configured unit including D1 sub-frames, D2 slots, D3 mini-slots and D4 symbols, wherein D1, D2, D3 and D4 are integers greater than or equal to 1.

The above described terminal further includes:

a third determining module configured to: in a case that the indication information is not received or the indication information fails to be received, determine not to perform the target transmission in the target time unit, or determine to perform the target transmission in the target time unit according to a size and/or a location of pre-defined or pre-configured time field resource; or, in a case that an indication field for indicating time field resources of the target transmission exists in the downlink control channel, determine to perform the target transmission in the target time unit according to the time field resources indicated by the indication field.

A base station is further provided according to an embodiment of the present disclosure. The base station includes:

a transmitting module, configured to transmit a downlink control channel, and indication information for indicating a division of uplink resources and downlink resources in a time unit;

a fourth determining module, configured to determine uplink resources and/or downlink resources in a target time unit corresponding to the downlink control channel, according to the indication information, wherein the target time unit is the time unit in which a target transmission corresponding to the downlink control channel is located; and a fifth determining module, configured to determine time field resources of the target transmission corresponding to the downlink control channel in the uplink resources or the downlink resources, and perform the target transmission in the time field resources.

Specifically, the transmitting module is configured to transmit the indication information through a high layer signaling, a broadcast signal, or a downlink control channel.

Specifically, the transmitting module is configured to transmit the indication information in the target time unit corresponding to the downlink control channel or in a time unit previous to the target time unit.

Specifically, the target transmission corresponding to the downlink control channel includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

The target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The fifth determining module includes:

a fourth determining sub-module, configured to take all symbols or all mini-slots, or all slots or all sub-frames, or a part of symbols or a part of mini-slots, or a part of slots or a part of sub-frames, in the uplink resources or the downlink resources, as the time field resource of the target transmission; or a fifth determining sub-module, configured to take all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1.

The fifth determining module includes:

a sixth determining sub-module configured to: in a case that an indication field for indicating time field resources of the target transmission exists in the downlink control channel, determine the time field resources of the target transmission in the uplink resources or the downlink resources according to the indication field and the indication information.

The sixth determining sub-module includes:

a fourth determining unit configured to: in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, take the time field resources indicated by the indication field as time field resources of the target transmission;

a fifth determining unit configured to: in a case that the time field resources indicated by the indication field exceed a size of the uplink resources or the downlink resources determined according to the indication information, take the uplink resources or the downlink resources as time field resources of the target transmission, or take time field resources indicated by the indication field as time field resources of the target transmission, or take a maximum value or a minimum value of time field resources indicated by the indication field and the time field resources indicated by the uplink resources or the downlink resources as time field resources of the target transmission; and a sixth determining unit configured to: in a case that the time field resources indicated by the indication field exceed a size of an area pre-agreed or pre-configured for data transmission in the uplink resources or the downlink resources which are determined according to the indication information, take the area pre-agreed or pre-configured for data transmission in the uplink resources or the downlink resources as time field resources of the target transmission, or take time field resources indicated by the indication field as time field resources of the target transmission, or take a maximum value or a minimum value of the time field resources indicated by the indication field and the time field resources indicated by the area pre-agreed or pre-configured for data transmission in the uplink resources or the downlink resources as time field resources of the target transmission.

The indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

The structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

The time unit and the target time unit each is a pre-defined or pre-configured unit including D1 sub-frames, D2 slots, D3 mini-slots and D4 symbols, wherein D1, D2, D3 and D4 are integers greater than or equal to 1.

The above described base station further includes:

a sixth determining module configured to: in a case that the indication information is not received by the terminal or the indication information fails to be received, determine not to perform the target transmission in the target time unit, or determine to perform the target transmission in the target time unit according to a size and/or a location of pre-defined or pre-configured time field resource; or, in a case that an indication field for indicating time field resources of the target transmission exists in the downlink control channel, determine to perform the target transmission in the target time unit according to the time field resources indicated by the indication field.

A terminal is also provided according to an embodiment of the present disclosure, which includes a processor, a transceiver, and a memory;

The processor is configured to read a program in the memory to:

receive a downlink control channel, and indication information for indicating a division of uplink resources and downlink resources in a time unit;

determine uplink resources and/or downlink resources in a target time unit corresponding to the downlink control channel, according to the indication information, wherein the target time unit is the time unit in which a target transmission corresponding to the downlink control channel is located; and determine time field resources of the target transmission corresponding to the downlink control channel in the uplink resources or the downlink resources, and perform the target transmission in the time field resources.

The transceiver is configured to receive and transmit data.

The memory is configured to store data used by the processor to perform an operation.

A base station is also provided according to an embodiment of the present disclosure, which includes a processor, a transceiver, and a memory;

The processor is configured to read a program in the memory to:

transmit a downlink control channel, and indication information for indicating a division of uplink resources and downlink resources in a time unit;

determine uplink resources and/or downlink resources in a target time unit corresponding to the downlink control channel, according to the indication information, wherein the target time unit is the time unit in which a target transmission corresponding to the downlink control channel is located; and determine time field resources of the target transmission corresponding to the downlink control channel in the uplink resources or the downlink resources, and perform the target transmission in the time field resources.

The transceiver is configured to receive and transmit data.

The memory is configured to store data used by the processor to perform an operation.

Embodiments of the present disclosure have the following advantageous effects:

With the foregoing technical solutions of the embodiments of the present disclosure, the object of realizing transmission in a variable slot structure is achieved by: receiving a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

DETAILED DESCRIPTION

Hereinafter, the present disclosure will be described in detail in connection with specific embodiments and accompanying drawings, so that the technical problems to be solved by the present disclosure, the technical solutions and advantages of the present disclosure will become clearer.

In a data transmission method according to an embodiment of the present disclosure, time field resources of a target transmission corresponding to a downlink control channel are determined, according to indication information for indicating a division of uplink resources and downlink resources in a time unit, and the downlink control channel, so that the object of realizing target transmission in a determined time field resource is achieved.

Figure 1:
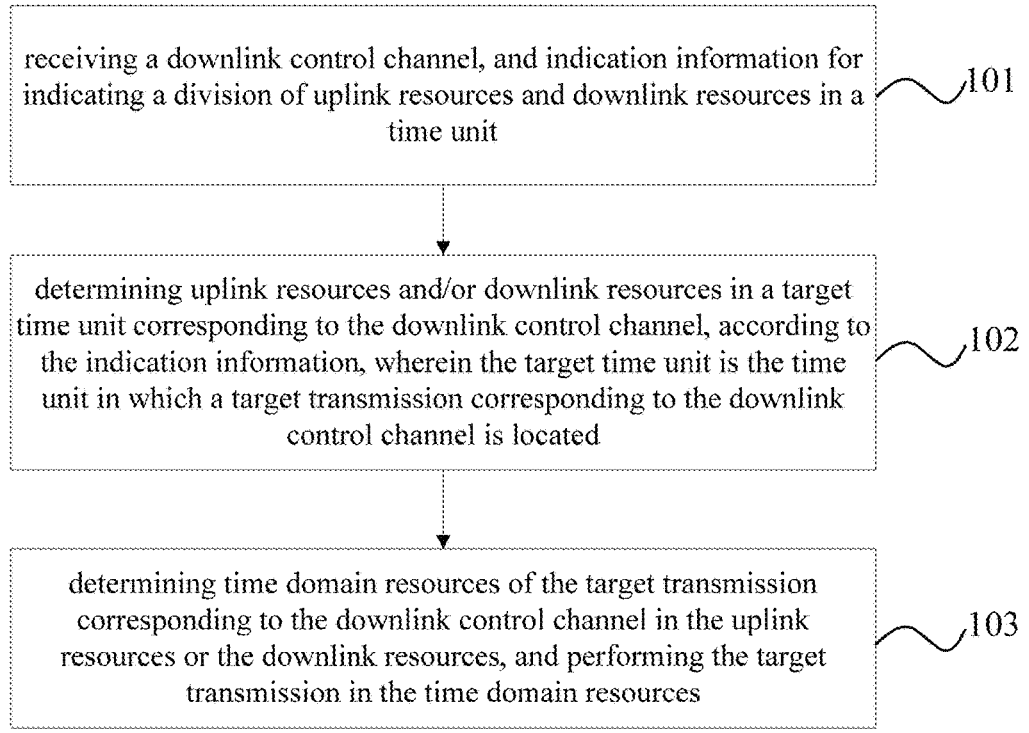
FIG. 1 is a first workflow diagram of a data transmission method according to some embodiments of the present disclosure.

As shown in FIG. 1, a data transmission method is provided according to an embodiment of the present disclosure, which is applied to a terminal. The method includes steps 101 to 103.

Step 101: receiving a downlink control channel, and indication information for indicating a division of uplink resources and downlink resources in a time unit.

In this step, the downlink control channel is a downlink control channel using an uplink DCI format (i.e., a downlink control channel carrying an uplink scheduling grant, that is, an uplink scheduling instruction (UL grant)) and/or a downlink control channel using a downlink DCI format (i.e., a downlink control channel carrying a downlink scheduling grant, that is, a downlink scheduling instruction (DL grant), including a downlink control channel indicating a release of a short downlink semi-persistent scheduling (SPS) resource).

Optionally, the step 101 of receiving indication information for indicating the division of uplink resources and downlink resources in the time unit includes: receiving the indication information through a high layer signaling, a broadcast signal, or a downlink control channel. The indication information is shared by the terminal or exclusive to the terminal.

Optionally, the step 101 of receiving indication information for indicating the division of uplink resources and downlink resources in the time unit further includes: receiving the indication information in the target time unit corresponding to the downlink control channel or in a time unit previous to the target time unit.

Here, in a case that the indication information is received in a time unit previous to the target time unit, when the target time unit is determined to be a full-uplink according to the indication information, in the target time unit, the terminal may not detect the indication information used to indicate the division of uplink resources and downlink resources, thereby achieving the purpose of power saving.

In this step, by receiving the downlink control channel and the indication information for indicating the division of uplink resources and downlink resources in a time unit, the target transmission corresponding to the downlink control channel and the division of uplink resources and downlink resources in the target time unit corresponding to the target transmission are acquired.

Step 102: determining uplink resources and/or downlink resources in a target time unit corresponding to the downlink control channel, according to the indication information, wherein the target time unit is the time unit in which a target transmission corresponding to the downlink control channel is located.

Specifically, in a case that the above downlink control channel is a downlink control channel that uses an uplink DCI format, only the uplink resource in the target time unit is determined according to the indication information, or both the uplink resource and downlink resource in the target time unit are determined.

In a case that the above downlink control channel is a downlink control channel that uses a downlink DCI format, and the target transmission is a downlink shared channel scheduled by the downlink control channel, only the downlink resource in the target time unit is determined according to the indication information, or both the uplink resource and downlink resource in the target time unit are determined.

In a case that the downlink control channel is a downlink control channel that uses a downlink DCI format, and the target transmission is an ACK/NACK feedback corresponding to the downlink shared channel scheduled by the downlink control channel or an ACK/NACK feedback corresponding to the downlink control channel, only the uplink resource in the target time unit is determined according to the indication information, or both the uplink resource and downlink resource in the target time unit are determined.

Further, in this step, the target transmission corresponding to the downlink control channel includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

The target time unit is one of: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

Further, when the downlink control channel is a downlink control channel using an uplink DCI format, the downlink control channel using an uplink DCI format is configured to schedule uplink shared channel transmission in a current time unit, or an A1-th time unit after the current time unit, or A2 continuous time units starting from the current time unit, or A3 continuous time units after the current time unit, wherein each of A1, A2 and A3 is an integer greater than or equal to 1, and A1, A2 and A3 are pre-agreed and pre-configured, or A1, A2, and A3 are determined according to the indication field in the downlink control channel using the uplink DCI format, wherein the current time unit is a time unit in which the downlink control channel transmission using the uplink DCI format is located.

Further, when the downlink control channel is a downlink control channel using a downlink DCI format:

the downlink shared channel scheduled by the downlink control channel using the downlink DCI format or the downlink control channel using the downlink DCI format itself needs to feed back ACK/NACK in a current time unit, or a B1-th time unit after the current time unit, or B2 continuous time units starting from the current time unit, or B3 continuous time units after the current time unit, wherein each of B1, B2 and B3 is an integer greater than or equal to 1, and B1, B2 and B3 are pre-agreed and pre-configured, or B1, B2, and B3 are determined according to the indication field in the downlink control channel using the downlink DCI format, wherein the current time unit is a time unit in which the downlink control channel transmission using the downlink DCI format is located; or the downlink control channel using an downlink DCI format is configured to schedule downlink shared channel transmission in a current time unit, or a C1-th time unit after the current time unit, or C2 continuous time units starting from the current time unit, or C3 continuous time units after the current time unit, wherein each of C1, C2 and C3 is an integer greater than or equal to 1, and C1, C2 and C3 are pre-agreed and pre-configured, or C1, C2 and C3 are determined according to the indication field in the downlink control channel using the downlink DCI format, wherein the current time unit is a time unit in which the downlink control channel transmission using the downlink DCI format is located.

Further, when the downlink control channel is a downlink control channel using an uplink DCI format, the time unit corresponding to the downlink control channel is: a time unit in which the uplink shared channel transmission scheduled by the downlink control channel is located (i.e., the current time unit, or an A1-th time unit after the current time unit, or A2 continuous time units starting from the current time unit, or A3 continuous time units after the current time unit, wherein the current time unit is a time unit in which the downlink control channel transmission is located).

Further, when the downlink control channel is a downlink control channel using a downlink DCI format, the time unit corresponding to the downlink control channel is: a time unit in which an ACK/NACK transmission corresponding to the downlink shared channel scheduled by the downlink control channel or an ACK/NACK transmission corresponding to the downlink control channel itself is located (the current time unit, or a B1-th time unit after the current time unit, or B2 continuous time units starting from the current time unit, or B3 continuous time units after the current time unit, wherein the current time unit is a time unit in which the downlink control channel transmission is located), or a time unit in which the downlink shared channel transmission scheduled by the downlink control channel is located (a current time unit, or a C1-th time unit after the current time unit, or C2 continuous time units starting from the current time unit, or C3 continuous time units after the current time unit, wherein the current time unit is a time unit in which the downlink control channel transmission is located).

The time unit and the target time unit each is a pre-defined or pre-configured unit including D1 sub-frames, D2 slots, D3 mini-slots and D4 symbols, wherein D1, D2, D3 and D4 are integers greater than or equal to 1.

Step 103: determining time field resources of the target transmission corresponding to the downlink control channel in the uplink resources or the downlink resources, and performing the target transmission in the time field resources.

Specifically, all symbols or all mini-slots, or all slots or all sub-frames, or a part of symbols or a part of mini-slots, or a part of slots or a part of sub-frames in the uplink resources or the downlink resources are taken as the time field resource of the target transmission; or all symbols or all mini-slots, or all slots or all sub-frames, or a part of symbols or a part of mini-slots, or a part of slots or a part of sub-frames in resources pre-agreed or pre-configured for data transmission in the uplink resources or the downlink resources are taken as the time field resource of the target transmission;

wherein the mini-slot is a unit occupying X symbols, and X is an integer greater than or equal to 1.

The symbols mentioned herein may be Orthogonal Frequency Division Multiplexing (OFDM) symbols or Single Carrier-Frequency Division Multiple Access (SC-FDMA) symbols, and of course can also be other orthogonal multiple access symbols, such as Pattern Division Multiple Access (PDMA) symbols, Sparse Code Multiplexing Access (SCMA) symbols, Filtered Orthogonal Frequency Division Multiplexing (F-OFDM) symbols, Non-Orthogonal Multiple Access (NOMA) symbols and Cyclic Prefix-OFDM (CP-OFDM) symbols.

Further, when the downlink control channel is a downlink control channel using an uplink DCI format, the transmission corresponding to the downlink control channel is: an uplink shared channel scheduled by the downlink control channel.

The time field resource of the uplink shared channel is determined to be all or part of symbols in an uplink area, determined according to the indication information, in a time unit in which the uplink shared channel transmission is located.

Further, in a case that the downlink control channel contains an indication field that can indicate the time field resource of the uplink shared channel, the time field resource indicated by the indication field in the downlink control channel may be less than, equal to, or greater than a size of the uplink area determined by the indication information; and when the time field resource indicated by the indication field in the downlink control channel is greater than the size of the uplink area determined by the indication information, it is always possible to perform the transmission according to the size of the uplink area, or it is always possible to perform the transmission according to the time field resource indicated by the indication field in the downlink control channel, or a maximum value or a minimum value of the size of the uplink area and the time field resource indicated by the indication field in the downlink control channel is used.

When the downlink control channel is a downlink control channel using a downlink DCI format, the transmission corresponding to the downlink control channel is: an ACK/NACK corresponding to a downlink shared channel scheduled by the downlink control channel, or an ACK/NACK corresponding to the downlink control channel itself.

The time field resource of the ACK/NACK transmission is determined to be all or part of symbols in an uplink area, determined according to the indication information, in a time unit in which the ACK/NACK transmission is located.

Further, in a case that the downlink control channel contains an indication field that can indicate the time field resource of the ACK/NACK transmission, the time field resource indicated by the indication field in the downlink control channel may be less than, equal to, or greater than the size of the uplink area determined by the indication information; and when the time field resource indicated by the indication field in the downlink control channel is greater than the size of the uplink area determined by the indication information, it is always possible to perform the transmission according to the size of the uplink area, or it is always possible to perform the transmission according to the time field resource indicated by the indication field in the downlink control channel, or a maximum value or a minimum value of the size of the uplink area and the time field resource indicated by the indication field in the downlink control channel is used.

Alternatively, when the downlink control channel is a downlink control channel using a downlink DCI format, the transmission corresponding to the downlink control channel is: a downlink shared channel scheduled by the downlink control channel.

The time field resource of the downlink shared channel is determined to be all or part of symbols for data transmission in the allocated downlink area in a time unit in which the downlink shared channel transmission is located (that is, in a case that a control area is defined, the symbol of the control area is removed).

Further, in a case that the downlink control channel contains an indication field that can indicate the time field resource of the downlink shared channel transmission, the time field resource indicated by the indication field in the downlink control channel may be less than, equal to, or greater than the size of the downlink area determined by the indication information; and when the time field resource indicated by the indication field in the downlink control channel is greater than the size of the downlink area determined by the indication information, it is always possible to perform the transmission according to the size of the downlink area, or it is always possible to perform the transmission according to the time field resource indicated by the indication field in the downlink control channel, or a maximum value or a minimum value of the size of the downlink area and the time field resource indicated by the indication field in the downlink control channel is used.

Further, in a case that an indication field for indicating time field resources of the target transmission exists in the downlink control channel, the above step 103 includes: determining time field resources of the target transmission in the uplink resources or the downlink resources according to the indication field and the indication information.

Specifically, in a case that the time field resources indicated by the indication field do not exceed the size of the uplink resources or the downlink resources determined according to the indication information, or do not exceed the size of an area pre-agreed or pre-configured for data transmission in the uplink resources or the downlink resources which are determined according to the indication information, the time field resources indicated by the indication field are taken as time field resources of the target transmission; or in a case that the time field resources indicated by the indication field exceed the size of the uplink resources or the downlink resources determined according to the indication information, the uplink resources or the downlink resources are taken as time field resources of the target transmission, or time field resources indicated by the indication field are taken as time field resources of the target transmission, or a maximum value or a minimum value of time field resources indicated by the indication field and the time field resources indicated by the uplink resources or the downlink resources are taken as time field resources of the target transmission; or in a case that the time field resources indicated by the indication field exceed a size of an area pre-agreed or pre-configured for data transmission in the uplink resources or the downlink resources which are determined according to the indication information, the area pre-agreed or pre-configured for data transmission in the uplink resources or the downlink resources is taken as time field resource of the target transmission, or time field resources indicated by the indication field are taken as time field resources of the target transmission, or a maximum value or a minimum value of the time field resources indicated by the indication field and the time field resources indicated by the area pre-agreed or pre-configured for data transmission in the uplink resources or the downlink resources is taken as time field resource of the target transmission.

The time field resource of the target transmission is indicated by the downlink control channel or is pre-defined.

Further, in a case that an indication field for indicating time field resources of the target transmission exists in the downlink control channel, in a case where the time field resource indicated by the indication field starts from a first symbol of one time unit, it is determined that the time unit is a full-uplink, or in a case where the time field resource indicated by the indication field spans two time units, it is determined that the second time unit is full-uplink. In the time unit determined to be the full-uplink, the terminal may not detect the indication information used to indicate the division of uplink resources and downlink resources in the time unit, thereby achieving the purpose of power saving.

The data transmission method of some embodiments of the present disclosure determines time field resource of the corresponding transmission, based on the scheduling signaling and the indication information indicating the division of uplink resources and downlink resources.

Further, the indication information in some embodiments of the present disclosure is specifically used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

The resource size refers to the number of symbols or mini-slots or slots or sub-frames as included, and the location refers to the index or numbering of symbols or mini-slots or slots or sub-frames as included.

The structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

Further, the third structure type may be classified into a structure type in which the uplink is dominant (that is, most of the symbols in the time unit are uplink) and a structure type in which the downlink is dominant (that is, most of the symbols in the time unit are downlink).

For example, the indication information indicates that the time unit is one of: full-uplink; full-downlink; and both uplink and downlink; wherein a plurality of structure types including both uplink and downlink may be pre-defined or pre-configured, and each of the structure types corresponds to a different allocation ratio of uplink and downlink (that is, different numbers of uplink symbols and downlink symbols), or the allocation ratio of uplink and downlink can be dynamically adjusted for the structure type including both uplink and downlink (for example, the GP size is dynamically determined according to neighboring interference, TA demand and the like so as to dynamically adjust the size of the uplink area and/or the downlink area.

For another example, the indication information indicates that the time unit is one of a plurality of pre-defined or pre-configured structure types including both uplink and downlink; wherein each of the plurality of pre-defined or pre-configured structure types including both uplink and downlink corresponds to a different allocation ratio of uplink and downlink (that is, different numbers of uplink symbols and downlink symbols).

For still another example, the indication information indicates that the time unit is one of: full-uplink; full-downlink; uplink-dominant; and downlink-dominant; wherein a plurality of uplink-dominant and/or downlink-dominant structure types may be pre-defined or pre-configured, and each of the structure types corresponds to a different allocation ratio of uplink and downlink (that is, different numbers of uplink symbols and downlink symbols).

Further, the time unit and the target time unit each is a pre-defined or pre-configured unit including D1 sub-frames, D2 slots, D3 mini-slots and D4 symbols, wherein D1, D2, D3 and D4 are integers greater than or equal to 1.

Further, the data transmission method according to some embodiments of the present disclosure further includes:

in a case that the indication information is not received or the indication information fails to be received, determining not to perform the target transmission in the target time unit, or determining to perform the target transmission in the target time unit according to a size and/or a location of pre-defined or pre-configured time field resource; or, in a case that an indication field for indicating time field resources of the target transmission exists in the downlink control channel, determining to perform the target transmission in the target time unit according to the time field resources indicated by the indication field.

For uplink transmissions, such as uplink shared channel and ACK/NACK, etc., when performing transmission according to a predefined or pre-configured time field resource size and/or location, the predefined or pre-configured time field resource size and/or location may be, for example, the last 1 or 2 symbols or mini-slots and the like in the target time unit, and of course other locations or sizes may also be agreed.

For downlink transmissions, such as downlink shared channel, when performing transmission according to a predefined or pre-configured time field resource size and/or location, the predefined or pre-configured time field resource size and/or location may be, for example, the last 1 or 2 symbols or mini-slots and the like in the target time unit, and of course other locations or sizes may also be agreed. It is also possible to start a blind-detection on the downlink control channel at the start time of the target time unit, and when the downlink control channel is detected, a corresponding transmission is performed according to the scheduling of the downlink control channel.

With the data transmission method according to some embodiments of the present disclosure, the object of realizing transmission in a variable slot structure is achieved by: receiving a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

Figure 2:
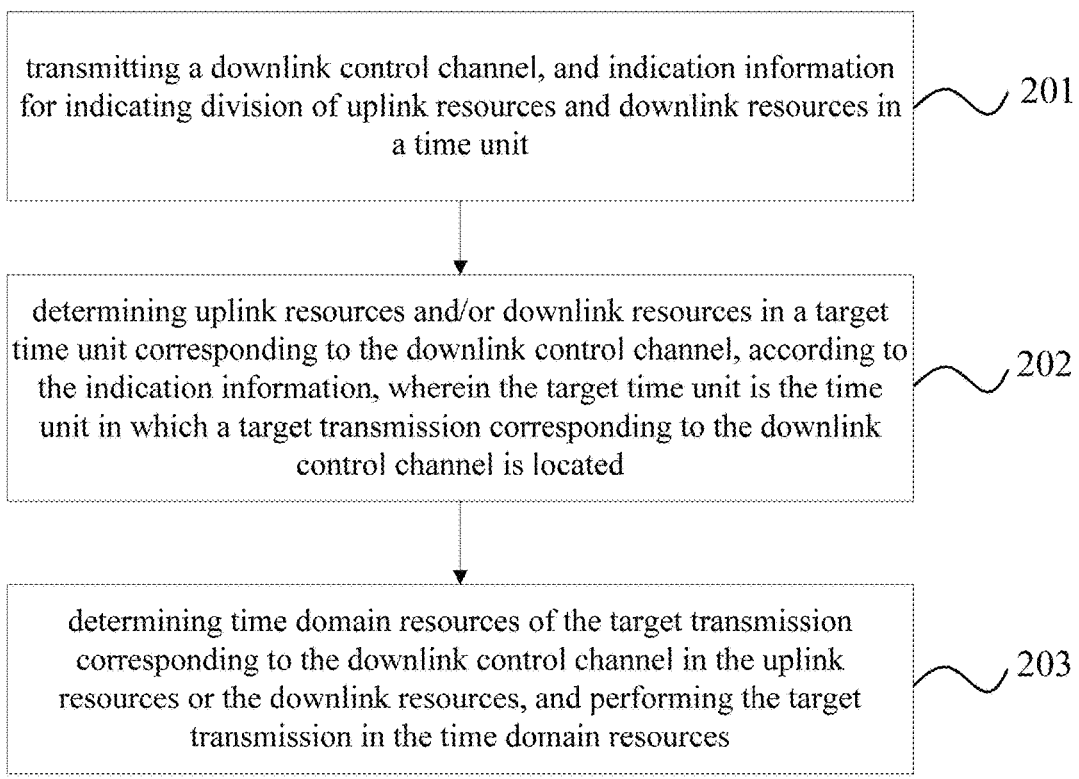
FIG. 2 is a second workflow diagram of a data transmission method according to some embodiments of the present disclosure.

As shown in FIG. 2, a data transmission method applied to a base station is further provided according to some embodiments of the present disclosure. The method includes steps 201 to 203.

Step 201: transmitting a downlink control channel, and indication information for indicating a division of uplink resources and downlink resources in a time unit.

In this step, the downlink control channel is a downlink control channel using an uplink DCI format (i.e., a downlink control channel carrying an uplink scheduling grant, that is, an uplink scheduling instruction (UL grant)) and/or a downlink control channel using a downlink DCI format (i.e., a downlink control channel carrying a downlink scheduling grant, that is, a downlink scheduling instruction (DL grant), including a downlink control channel indicating a release of a short downlink semi-persistent scheduling (SPS) resource).

Optionally, the step 201 of transmitting indication information for indicating the division of uplink resources and downlink resources in the time unit includes: transmitting the indication information through a high layer signaling, a broadcast signal, or a downlink control channel. The indication information is shared by the terminal or exclusive to the terminal.

Optionally, the step 201 of transmitting indication information for indicating the division of uplink resources and downlink resources in the time unit further includes: transmitting the indication information in the target time unit corresponding to the downlink control channel or in a time unit previous to the target time unit.

Step 202: determining uplink resources and/or downlink resources in a target time unit corresponding to the downlink control channel, according to the indication information, wherein the target time unit is the time unit in which a target transmission corresponding to the downlink control channel is located.

Step 202 is the same as the above step 102, and thus no repeated description is given herein.

Step 203: determining time field resources of the target transmission corresponding to the downlink control channel in the uplink resources or the downlink resources, and performing the target transmission in the time field resources.

Step 203 is the same as the above step 103, and thus no repeated description is given herein. For an uplink shared channel, the activity of the base station is receiving; for a downlink shared channel, the activity of the base station is transmitting; and for ACK/NACK feedback information, the activity of the base station is receiving.

With the data transmission method according to some embodiments of the present disclosure, the object of realizing transmission on determined time field resource is achieved by: the base station transmitting a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

In some embodiments of the present disclosure, an example is used in which one slot is one time unit. It is assumed that one slot contains 7 symbols (Orthogonal Frequency Division Multiplexing (OFDM) or Single Carrier Frequency Division Multiple Access (SC-FDMA) symbols); of course, definitions of a time unit of other lengths are not excluded.

A specific implementation process of the data transmission method of some embodiments of the present disclosure is as follows.

It is assumed that the indication information sent at a specific time-frequency position in the current time unit is used to indicate the division of uplink area and downlink area in the current time unit, and it is assumed that the UL grant sent in the downlink resource in the current time unit can schedule a physical uplink shared channel PUSCH transmission in the uplink area of the current time unit (that is, the uplink processing delay of the terminal is sufficient; of course, the scheduling relationship may not be pre-agreed, and may be notified in the UL grant, for example, directly notifying the PUSCH to transmit in the current or next time unit, or in the subsequent several time units).

Figure 3:
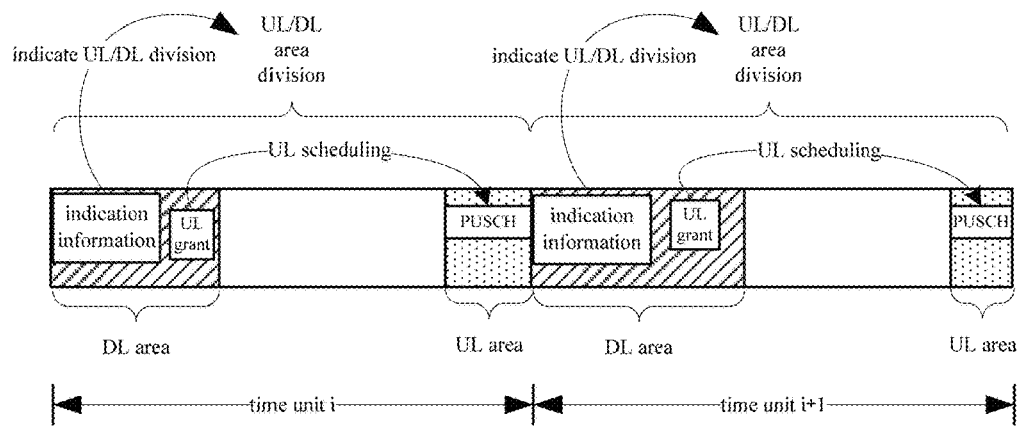
FIG. 3 is a first schematic transmission diagram of a data transmission method according to some embodiments of the present disclosure.

As shown in FIG. 3, the base station first determines the sizes of the downlink area and the uplink area divided by the time unit i, and sends indication information on a specific time frequency resource, in each time unit, that sends the indication information, for notifying the division of uplink area and downlink area in the time unit. Specifically, two of the following indication information may be notified: the size of downlink area in the time unit, the size of uplink area, and the size of GP. Also, one of a plurality of pre-defined uplink and downlink structure types may be notified. Then, in the downlink area of one time unit, the UL grant is sent, and the terminal is scheduled to perform PUSCH transmission in the uplink area in this time unit. Finally, according to the uplink area size indicated by the indication information, the PUSCH sent by the terminal is received on the frequency field resource scheduled by the UL grant.

The terminal first detects the indication information on the specific time frequency resource, in the time unit, that sends the indication information, and determines the division of uplink area and downlink area in the time unit. The specific notification manner is consistent with the base station agreement, and may be any of those listed by the base station side. In a case that the division of uplink resources and downlink resources in one time unit is indicated by the indication information sent in the time unit in front of said one time unit, when the terminal determines that said one time unit is a full uplink according to the indication information, it may be determined that the indication information is not detected in this time unit, thereby achieving the purpose of power saving; then the terminal detects the UL grant in the downlink area of one time unit; finally, when the UL grant is received, according to the frequency field scheduling information in the UL grant, PUSCH transmission is performed in the uplink area in the time unit, wherein the PUSCH occupies all the time field resources in the uplink area, that is, the PUSCH is transmitted according to the time field length of the uplink area.

In some embodiments of the present disclosure, only an example in which the indication information sent in the current time unit indicates the division of uplink area and downlink area in the current time unit is used. Of course, in a case that the indication relationship refers to the next time unit or subsequent several time units, the process is similar, which is also included in the present disclosure and no repeated description will be given herein; the scheduling relationship may also be that the UL grant sent in the time unit i schedules PUSCH transmission in the time unit i+1, or the UL grant sent in the time unit i schedules PUSCH transmission in the time units i and i+1 (of course, more continuous time units can be scheduled); various manners of the scheduling relationship and various indication relationships of the indication information can be combined with each other.

Figure 4:
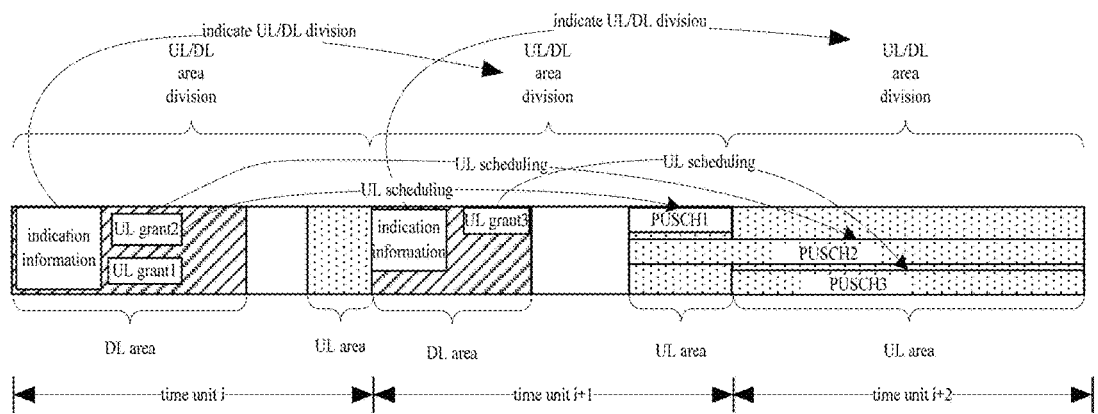
FIG. 4 is a second schematic transmission diagram of a data transmission method according to some embodiments of the present disclosure.

As shown in FIG. 4, the indication information sent in the current time unit indicates the division of uplink area and downlink area in the next time unit, and the UL grant sent in the current time unit schedules the PUSCH transmission in the uplink area in the next time unit. It is assumed that the indication information in the time unit i+1 indicates that the time unit i+2 is a full uplink, then the uplink area in the time unit i+1 is adjacent to the uplink area in the time unit i+2, and in this situation the PUSCH may be scheduled to be transmitted only in the uplink area in one time unit, such as PUSCH1 scheduled by UL grant1, and PUSCH3 scheduled by UL grant3. The PUSCH may also be scheduled to be transmitted in the uplink areas in two time units, such as PUSCH2 scheduled by UL grant2.

Figure 5:
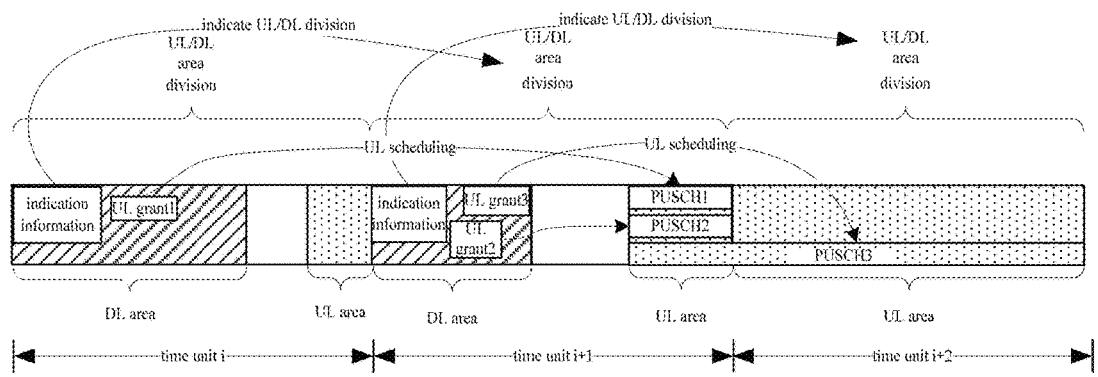
FIG. 5 is a third schematic transmission diagram of a data transmission method according to some embodiments of the present disclosure.

As shown in FIG. 5, the indication information sent in the current time unit indicates the division of uplink area and downlink area in the next time unit, and the UL grant sent in the current time unit schedules the PUSCH transmission in the uplink area in the current time unit or the next time unit. For example, UL grant1 in the time unit i schedules PUSCH1 transmission in the uplink area in the next time unit i+1, UL grant2 in the time unit i+1 schedules PUSCH2 transmission in the uplink area in the current time unit i+1, and UL grant3 in the time unit i+1 schedules PUSCH2 transmission in the uplink area in the current time unit i+1, and in the next time unit i+2; of course, other combinational relationships are also included in the present disclosure; in the above embodiment, only an example in which PUSCH transmission occupies all symbols in the uplink area in one time unit is used. Of course, in a case that there is indication information indicating the time field length of the PUSCH transmission (i.e., the number and location of occupied symbols) in the UL grant, the PUSCH may also occupy only part of the symbols in the uplink area for transmission.

In the foregoing embodiment, only the UL grant scheduling relationship is used as an example. The DL grant scheduling relationship is similar, and the ACK/NACK feedback relationship is also similar, both of which will not be described repeatedly.

In the data transmission method of some embodiments of the present disclosure, time field resource of the corresponding transmission is determined based on the scheduling signaling in the downlink control channel and the indication information indicating the division of uplink resource and downlink resource, so as to perform correct transmission.

Figure 6:
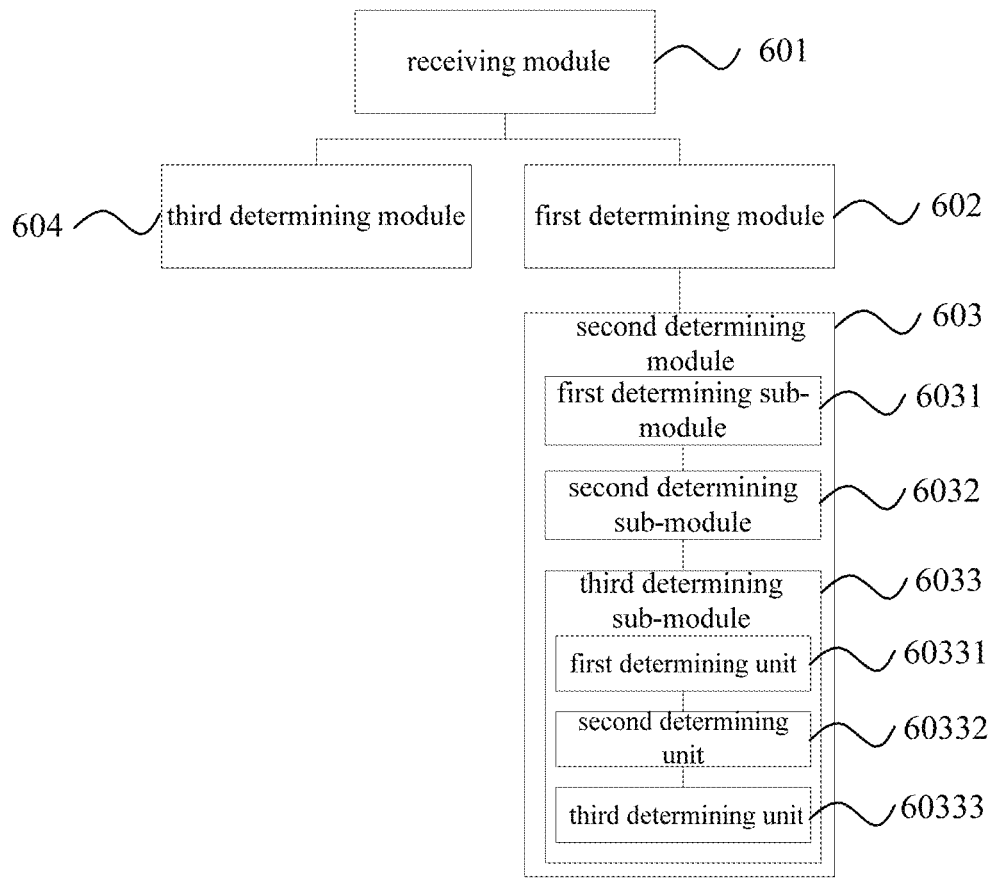
FIG. 6 is a first structural block diagram of a terminal according to some embodiments of the present disclosure.

As shown in FIG. 6, some embodiments of the present disclosure further provide a terminal, including:

a receiving module 601, configured to receive a downlink control channel, and indication information for indicating a division of uplink resources and downlink resources in a time unit;

a first determining module 602, configured to determine uplink resources and/or downlink resources in a target time unit corresponding to the downlink control channel, according to the indication information, wherein the target time unit is the time unit in which a target transmission corresponding to the downlink control channel is located; and a second determining module 603, configured to determine time field resources of the target transmission corresponding to the downlink control channel in the uplink resources or the downlink resources, and perform the target transmission in the time field resources.

In the terminal according to some embodiments of the present disclosure, the receiving module 601 is specifically configured to receive the indication information through a high layer signaling, a broadcast signal, or a downlink control channel.

In the terminal according to some embodiments of the present disclosure, the receiving module 601 is specifically configured to receive the indication information in the target time unit corresponding to the downlink control channel or in a time unit previous to the target time unit.

In the terminal according to some embodiments of the present disclosure, the target transmission corresponding to the downlink control channel specifically includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

In the terminal according to some embodiments of the present disclosure, the target time unit is one of: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

In the terminal according to some embodiments of the present disclosure, the second determining module 603 includes:

a first determining sub-module 6031, configured to take all symbols or all mini-slots, or all slots or all sub-frames, or a part of symbols or a part of mini-slots, or a part of slots or a part of sub-frames, in the uplink resources or the downlink resources, as the time field resource of the target transmission; or a second determining sub-module 6032, configured to take all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1.

In the terminal according to some embodiments of the present disclosure, the second determining module 603 includes:

a third determining sub-module 6033 configured to: in a case that an indication field for indicating time field resources of the target transmission exists in the downlink control channel, determine time field resources of the target transmission in the uplink resources or the downlink resources according to the indication field and the indication information.

In the terminal according to some embodiments of the present disclosure, the third determining sub-module 6033 includes:

a first determining unit 60331 configured to: in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, take the time field resources indicated by the indication field as time field resources of the target transmission;

a second determining unit 60332 configured to: in a case that the time field resources indicated by the indication field exceed a size of the uplink resources or the downlink resources determined according to the indication information, take the uplink resources or the downlink resources as time field resources of the target transmission, or take time field resources indicated by the indication field as time field resources of the target transmission, or take a maximum value or a minimum value of time field resources indicated by the indication field and the time field resources indicated by the uplink resources or the downlink resources as time field resources of the target transmission; and a third determining unit 60333 configured to: in a case that the time field resources indicated by the indication field exceed a size of an area pre-agreed or pre-configured for data transmission in the uplink resources or the downlink resources which are determined according to the indication information, take the area pre-agreed or pre-configured for data transmission in the uplink resources or the downlink resources as time field resources of the target transmission, or take time field resources indicated by the indication field as time field resources of the target transmission, or take a maximum value or a minimum value of the time field resources indicated by the indication field and the time field resources indicated by the area pre-agreed or pre-configured for data transmission in the uplink resources or the downlink resources as time field resources of the target transmission.

In the terminal according to some embodiments of the present disclosure, the indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

In the terminal according to some embodiments of the present disclosure, the structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

In the terminal according to some embodiments of the present disclosure, the time unit and the target time unit each is a pre-defined or pre-configured unit including D1 sub-frames, D2 slots, D3 mini-slots and D4 symbols, wherein D1, D2, D3 and D4 are integers greater than or equal to 1.

The terminal according to some embodiments of the present disclosure further includes:

a third determining module 604 configured to: in a case that the indication information is not received or the indication information fails to be received, determine not to perform the target transmission in the target time unit, or determine to perform the target transmission in the target time unit according to a size and/or a location of pre-defined or pre-configured time field resource; or, in a case that an indication field for indicating time field resources of the target transmission exists in the downlink control channel, determine to perform the target transmission in the target time unit according to the time field resources indicated by the indication field.

In the terminal according to some embodiments of the present disclosure, the object of realizing transmission in a variable slot structure is achieved by: receiving a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

Figure 7:
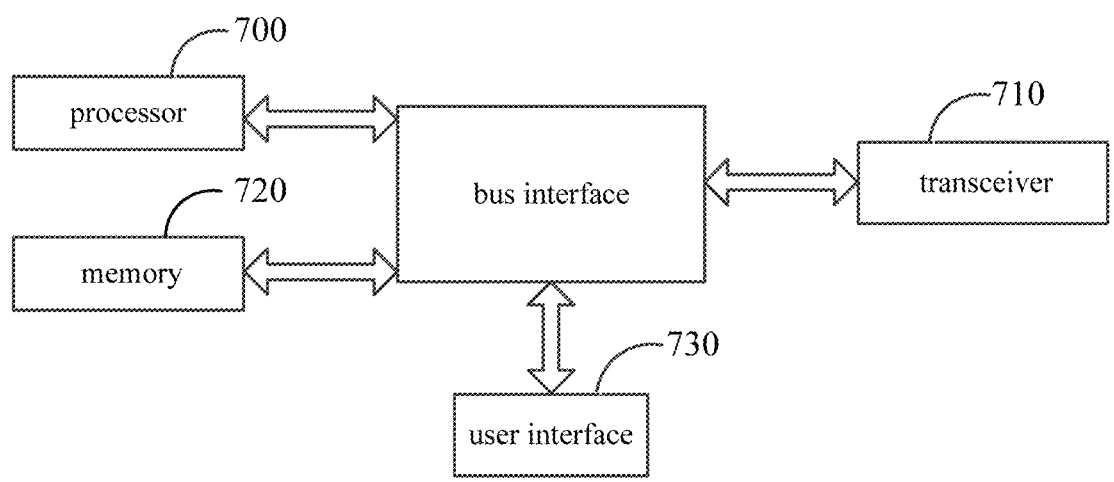
FIG. 7 is a second structural block diagram of a terminal according to some embodiments of the present disclosure.

In order to better achieve the above object, as shown in FIG. 7, some embodiments of the present disclosure further provide a terminal, which includes: a processor 700; a memory 720 connected to the processor 700 through a bus interface; and a transceiver 710 connected to the processor 700 through the bus interface; wherein the memory is configured to store programs and data used by the processor to execute operations; the transceiver 710 receives a downlink control channel; when the processor 700 calls and executes programs and data stored in the memory 720, the following functional modules are implemented:

a receiving module, configured to receive a downlink control channel, and indication information for indicating a division of uplink resources and downlink resources in a time unit;

a first determining module, configured to determine uplink resources and/or downlink resources in a target time unit corresponding to the downlink control channel, according to the indication information, wherein the target time unit is the time unit in which a target transmission corresponding to the downlink control channel is located; and a second determining module, configured to determine time field resources of the target transmission corresponding to the downlink control channel in the uplink resources or the downlink resources, and perform the target transmission in the time field resources.

The processor 700 is configured to read programs in the memory 720 and execute the following operations: receiving, by the transceiver 710, a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources The transceiver 710 is configured to receive and transmit data under the control of the processor 700.

In FIG. 7, the bus architecture may include any number of interconnected buses and bridges, which are specifically linked together by various circuits of one or more processors represented by the processor 700 and memories represented by the memory 720. The bus architecture may also link various other circuits together, such as peripherals, voltage regulators, and power management circuits, which are well known in the art and therefore are not further described herein. The bus interface provides an interface. The transceiver 710 may include a plurality of components, including a transmitter and a transceiver, and provide units for communicating with various other devices on a transmission medium. For different user equipment, the user interface 730 may also be an interface capable of externally/internally connecting with the required devices, the connected devices including but not limited to a keypad, a display, a speaker, a microphone, and a joystick.

The processor 700 is responsible for managing the bus architecture and the general processing, and the memory 720 can store data used by the processor 700 in performing operations.

In the terminal according to some embodiments of the present disclosure, the object of realizing transmission in a variable slot structure is achieved by: receiving, by the processor 700 via the transceiver 710, a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

Figure 8:
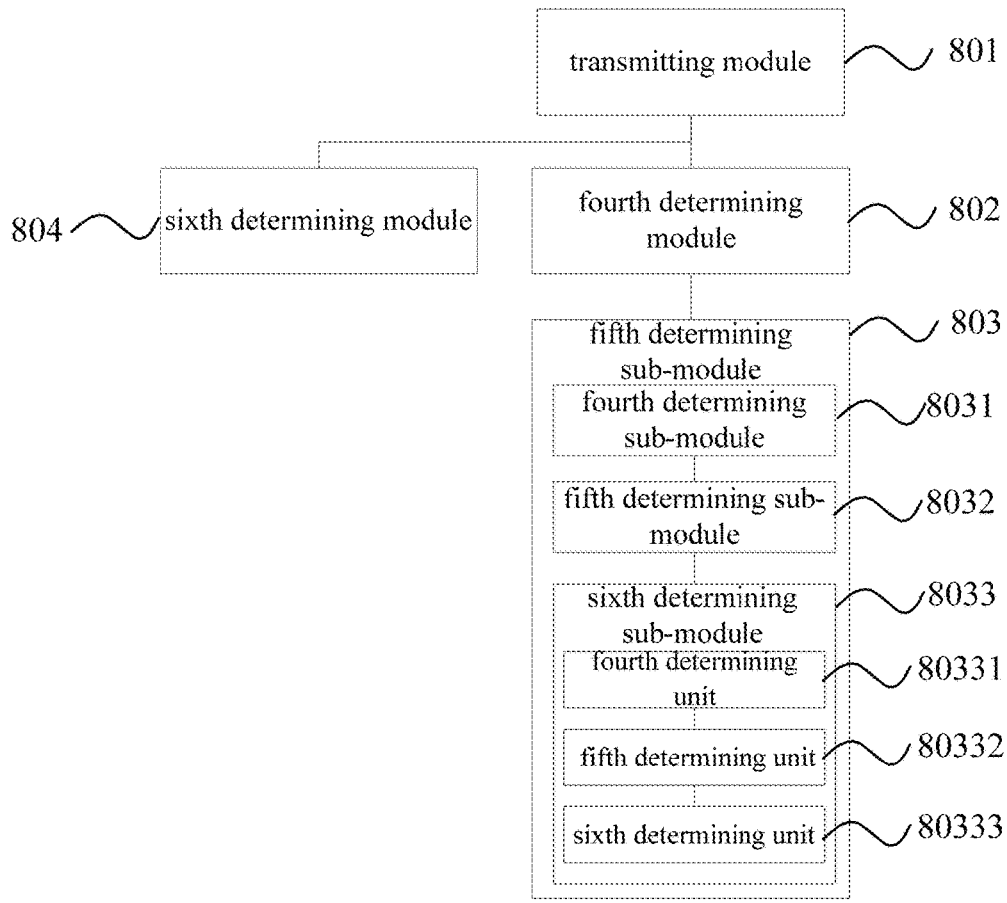
FIG. 8 is a first structural block diagram of a base station according to some embodiments of the present disclosure.

As shown in FIG. 8, a base station is further provided according to some embodiments of the present disclosure. The base station includes:

a transmitting module 801, configured to transmit a downlink control channel, and indication information for indicating a division of uplink resources and downlink resources in a time unit;

a fourth determining module 802, configured to determine uplink resources and/or downlink resources in a target time unit corresponding to the downlink control channel, according to the indication information, wherein the target time unit is the time unit in which a target transmission corresponding to the downlink control channel is located; and a fifth determining module 803, configured to determine time field resources of the target transmission corresponding to the downlink control channel in the uplink resources or the downlink resources, and perform the target transmission in the time field resources.

In the base station according to some embodiments of the present disclosure, the transmitting module is specifically configured to transmit the indication information through a high layer signaling, a broadcast signal, or a downlink control channel.

In the base station according to some embodiments of the present disclosure, the transmitting module is specifically configured to transmit the indication information in the target time unit corresponding to the downlink control channel or in a time unit previous to the target time unit.

In the base station according to some embodiments of the present disclosure, the target transmission corresponding to the downlink control channel specifically includes:

the target transmission corresponding to the downlink control channel being an uplink shared channel transmission scheduled by the downlink control channel, in a case that a DCI format used by the downlink control channel is an uplink DCI format; or the target transmission corresponding to the downlink control channel being a downlink shared channel transmission scheduled by the downlink control channel, in a case that a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, in a case that a DCI format used by the downlink control channel is a downlink DCI format.

In the base station according to some embodiments of the present disclosure, the target time unit is one of: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

In the base station according to some embodiments of the present disclosure, the fifth determining module 803 includes:

a fourth determining sub-module 8031, configured to take all symbols or all mini-slots, or all slots or all sub-frames, or a part of symbols or a part of mini-slots, or a part of slots or a part of sub-frames, in the uplink resources or the downlink resources, as the time field resource of the target transmission; or a fifth determining sub-module 8032, configured to take all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1.

In the base station according to some embodiments of the present disclosure, the fifth determining module 803 includes:

a sixth determining sub-module 8033 configured to: in a case that an indication field for indicating time field resources of the target transmission exists in the downlink control channel, determine time field resources of the target transmission in the uplink resources or the downlink resources according to the indication field and the indication information.

In the base station according to some embodiments of the present disclosure, the sixth determining sub-module 8033 includes:

a fourth determining unit 80331 configured to: in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, take the time field resources indicated by the indication field as time field resources of the target transmission;

a fifth determining unit 80332 configured to: in a case that the time field resources indicated by the indication field exceed a size of the uplink resources or the downlink resources determined according to the indication information, take the uplink resources or the downlink resources as time field resources of the target transmission, or take time field resources indicated by the indication field as time field resources of the target transmission, or take a maximum value or a minimum value of time field resources indicated by the indication field and the time field resources indicated by the uplink resources or the downlink resources as time field resources of the target transmission; and a sixth determining unit 80333 configured to: in a case that the time field resources indicated by the indication field exceed a size of an area pre-agreed or pre-configured for data transmission in the uplink resources or the downlink resources which are determined according to the indication information, take the area pre-agreed or pre-configured for data transmission in the uplink resources or the downlink resources as time field resources of the target transmission, or take time field resources indicated by the indication field as time field resources of the target transmission, or take a maximum value or a minimum value of the time field resources indicated by the indication field and the time field resources indicated by the area pre-agreed or pre-configured for data transmission in the uplink resources or the downlink resources as time field resources of the target transmission.

In the base station according to some embodiments of the present disclosure, the indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information includes a size and/or a location of the resource; or the indication information is used to indicate a structure type of a target time unit corresponding to the downlink control channel.

In the base station according to some embodiments of the present disclosure, the structure type includes at least one of:

a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

The time unit and the target time unit each is a pre-defined or pre-configured unit including D1 sub-frames, D2 slots, D3 mini-slots and D4 symbols, wherein D1, D2, D3 and D4 are integers greater than or equal to 1.

The base station according to some embodiments of the present disclosure further includes:

a sixth determining module 804 configured to: in a case that the indication information is not received by the terminal or the indication information fails to be received, determine not to perform the target transmission in the target time unit, or determine to perform the target transmission in the target time unit according to a size and/or a location of pre-defined or pre-configured time field resource; or, in a case that an indication field for indicating time field resources of the target transmission exists in the downlink control channel, determine to perform the target transmission in the target time unit according to the time field resources indicated by the indication field.

In the base station according to some embodiments of the present disclosure, the object of realizing target transmission on the determined time field resource is achieved by: transmitting a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

Figure 9:
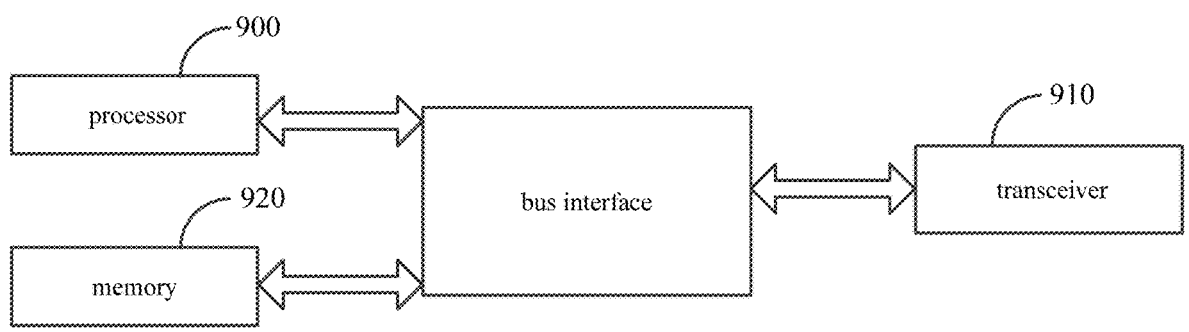
FIG. 9 is a second structural block diagram of a base station according to some embodiments of the present disclosure.

In order to better achieve the above object, as shown in FIG. 9, some embodiments of the present disclosure further provide a base station, which includes: a processor 900; a memory 920 connected to the processor 900 through a bus interface; and a transceiver 910 connected to the processor 900 through the bus interface; wherein the memory 920 is configured to store programs and data used by the processor in performing operations; the transceiver 910 sends data information or pilot frequency, and receives uplink control channel; when the processor 900 calls and executes programs and data stored in the memory 920, the following functional modules are implemented:

a transmitting module, configured to transmit a downlink control channel, and indication information for indicating a division of uplink resources and downlink resources in a time unit;

a fourth determining module, configured to determine uplink resources and/or downlink resources in a target time unit corresponding to the downlink control channel, according to the indication information, wherein the target time unit is the time unit in which a target transmission corresponding to the downlink control channel is located; and a fifth determining module, configured to determine time field resources of the target transmission corresponding to the downlink control channel in the uplink resources or the downlink resources, and perform the target transmission in the time field resources.

The processor 900 is configured to read programs in the memory 920 and execute the following operations: transmitting, by the transceiver 910, a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources The transceiver 910 is configured to receive and transmit data under the control of the processor 900.

In FIG. 9, the bus architecture may include any number of interconnected buses and bridges, which are specifically linked together by various circuits of one or more processors represented by the processor 700 and memories represented by the memory 720. The bus architecture may also link various other circuits together, such as peripherals, voltage regulators, and power management circuits, which are well known in the art and therefore are not further described herein. The bus interface provides an interface. The transceiver 910 may include a plurality of components, including a transmitter and a transceiver, and provide units for communicating with various other devices on a transmission medium. The processor 900 is responsible for managing the bus architecture and the general processing, and the memory 920 can store data used by the processor 900 in performing operations.

In the base station according to some embodiments of the present disclosure, the object of realizing the target transmission on the determined time field resource is achieved by: transmitting, by the processor 900 via the transceiver 910, a downlink control channel, and indication information for indicating a division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources. As such, the problem of realizing transmission in a variable slot structure which is not addressed in the related art is solved.

The above described are only some embodiments of the present disclosure, which are not intended to limit the present disclosure, and any modifications, equivalents, improvements, etc., made within the spirit and principles of the present disclosure should be included within the scope of protection of the present disclosure.

What is claimed is:

1. A data transmission method applied to a terminal, comprising:

receiving a downlink control channel, and indication information for indicating a division of uplink resources and downlink resources in a time unit;

determining uplink resources and/or downlink resources in a target time unit corresponding to the downlink control channel, according to the indication information, wherein the target time unit is the time unit in which a target transmission corresponding to the downlink control channel is located; and determining time field resources of the target transmission corresponding to the downlink control channel in the uplink resources or the downlink resources, and performing the target transmission in the time field resources;

wherein the time unit and the target time unit each is a pre-defined or pre-configured unit comprising one slot;

wherein the receiving the indication information for indicating the division of uplink resources and downlink resources in the time unit comprises:

receiving the indication information in the target time unit corresponding to the downlink control channel or in a time unit previous to the target time unit;

wherein the indication information is used to indicate resource information of a downlink resource in the target time unit corresponding to the downlink control channel; or to indicate resource information of an uplink resource in the target time unit corresponding to the downlink control channel; or to indicate at least two of: resource information of a downlink resource, resource information of an uplink resource, and resource information of a guard interval GP in the target time unit corresponding to the downlink control channel, wherein the resource information comprises a size and/or a location of the resource; or the indication information is used to indicate a structure type of the target time unit corresponding to the downlink control channel.

2. The data transmission method according to claim 1, wherein the target transmission corresponding to one of the following:

the downlink control channel is an uplink shared channel transmission scheduled by the downlink control channel, in a case that a DCI format used by the downlink control channel is an uplink DCI format; the downlink control channel is a downlink shared channel transmission scheduled by the downlink control channel, in a case that a DCI format used by the downlink control channel is a downlink DCI format; or the downlink control channel is an ACK/NACK feedback corresponding to a downlink shared channel scheduled by the downlink control channel or an ACK/NACK feedback corresponding to the downlink control channel, in a case that a DCI format used by the downlink control channel is a downlink DCI format;

and/or, the target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

3. The data transmission method according to claim 1, wherein the determining the time field resources of the target transmission corresponding to the downlink control channel in the uplink resources or the downlink resources comprises:

taking all symbols or all mini-slots, or all slots or all sub-frames, or a part of symbols or a part of mini-slots, or a part of slots or a part of sub-frames, in the uplink resources or the downlink resources, as the time field resource of the target transmission; or taking all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1; or in a case that an indication field for indicating time field resources of the target transmission exists in the downlink control channel, determining the time field resources of the target transmission in the uplink resources or the downlink resources according to the indication field and the indication information.

4. The data transmission method according to claim 3, wherein the determining the time field resources of the target transmission in the uplink resources or the downlink resources according to the indication field and the indication information comprises:

in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, taking the time field resources indicated by the indication field as time field resources of the target transmission; or in a case that the time field resources indicated by the indication field exceed a size of the uplink resources or the downlink resources determined according to the indication information, taking the uplink resources or the downlink resources as time field resources of the target transmission, or taking time field resources indicated by the indication field as time field resources of the target transmission, or taking a maximum value or a minimum value of time field resources indicated by the indication field and the time field resources indicated by the uplink resources or the downlink resources as time field resources of the target transmission; or in a case that the time field resources indicated by the indication field exceed a size of an area pre-agreed or pre-configured for data transmission in the uplink resources or the downlink resources which are determined according to the indication information, taking the area pre-agreed or pre-configured for data transmission in the uplink resources or the downlink resources as time field resource of the target transmission, or taking time field resources indicated by the indication field as time field resources of the target transmission, or taking a maximum value or a minimum value of the time field resources indicated by the indication field and the time field resources indicated by the area pre-agreed or pre-configured for data transmission in the uplink resources or the downlink resources as time field resource of the target transmission.

5. The data transmission method according to claim 1, wherein the structure type comprises at least one of:
a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

6. The data transmission method according to claim 1, further comprising:
in a case that the indication information is not transmitted or the indication information fails to be transmitted, determining not to perform the target transmission in the target time unit, or determining to perform the target transmission in the target time unit according to a size and/or a location of pre-defined or pre-configured time field resource; or, in a case that an indication field for indicating time field resources of the target transmission exists in the downlink control channel, determining to perform the target transmission in the target time unit according to the time field resources indicated by the indication field.

7. A data transmission method applied to a base station, comprising:
transmitting a downlink control channel, and indication information for indicating a division of uplink resources and downlink resources in a time unit;
determining uplink resources and/or downlink resources in a target time unit corresponding to the downlink control channel, according to the indication information, wherein the target time unit is the time unit in which a target transmission corresponding to the downlink control channel is located; and
determining time field resources of the target transmission corresponding to the downlink control channel in the uplink resources or the downlink resources, and performing the target transmission in the time field resources;
wherein the time unit and the target time unit each is a pre-defined or pre-configured unit comprising one slot;
the transmitting the indication information for indicating the division of uplink resources and downlink resources in the time unit comprises:
transmitting the indication information in the target time unit corresponding to the downlink control channel or in a time unit previous to the target time unit;
wherein the indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information comprises a size and/or a location of the resource; or
the indication information is used to indicate a structure type of a target time unit corresponding to the downlink control channel.

8. The data transmission method according to claim 7, wherein the target transmission corresponding to one of the following:
the downlink control channel is an uplink shared channel transmission scheduled by the downlink control channel, in a case that a DCI format used by the downlink control channel is an uplink DCI format; the downlink control channel is a downlink shared channel transmission scheduled by the downlink control channel, in a case that a DCI format used by the downlink control channel is a downlink DCI format; the downlink control channel is an ACK/NACK feedback corresponding to a downlink shared channel scheduled by the downlink control channel or an ACK/NACK feedback corresponding to the downlink control channel, in a case that a DCI format used by the downlink control channel is a downlink DCI format;
and/or,
the target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

9. The data transmission method according to claim 7, wherein the determining the time field resources of the target transmission corresponding to the downlink control channel in the uplink resources or the downlink resources comprises:
taking all symbols or all mini-slots, or all slots or all sub-frames, or a part of symbols or a part of mini-slots, or a part of slots or a part of sub-frames, in the uplink resources or the downlink resources, as the time field resource of the target transmission; or
taking all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;
wherein the mini-slot is a unit occupying X symbols, and X is an integer greater than or equal to 1; or
in a case that an indication field for indicating time field resources of the target transmission exists in the downlink control channel, determining the time field resources of the target transmission in the uplink resources or the downlink resources according to the indication field and the indication information.

10. The data transmission method according to claim 9, wherein the determining the time field resources of the target transmission in the uplink resources or the downlink resources according to the indication field and the indication information comprises:
in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, taking the time field resources indicated by the indication field as time field resources of the target transmission; or in a case that the time field resources indicated by the indication field exceed a size of the uplink resources or the downlink resources determined according to the indication information, taking the uplink resources or the downlink resources as time field resources of the target transmission, or taking time field resources indicated by the indication field as time field resources of the target transmission, or taking a maximum value or a minimum value of time field resources indicated by the indication field and the time field resources indicated by the uplink resources or the downlink resources as time field resources of the target transmission; or in a case that the time field resources indicated by the indication field exceed a size of an area pre-agreed or pre-configured for data transmission in the uplink resources or the downlink resources which are determined according to the indication information, taking the area pre-agreed or pre-configured for data transmission in the uplink resources or the downlink resources as time field resources of the target transmission, or taking time field resources indicated by the indication field as time field resources of the target transmission, or taking a maximum value or a minimum value of the time field resources indicated by the indication field and the time field resources indicated by the area pre-agreed or pre-configured for data transmission in the uplink resources or the downlink resources as time field resources of the target transmission.

11. The data transmission method according to claim 7, wherein the structure type comprises at least one of:
a first structure type in which symbols or mini-slots, or slots or sub-frames in the target time unit are all used for an uplink transmission; a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

12. The data transmission method according to claim 7, further comprising:
in a case that the indication information is not transmitted or the indication information fails to be transmitted, determining not to perform the target transmission in the target time unit, or determining to perform the target transmission in the target time unit according to a size and/or a location of pre-defined or pre-configured time field resource; or, in a case that an indication field for indicating time field resources of the target transmission exists in the downlink control channel, determining to perform the target transmission in the target time unit according to the time field resources indicated by the indication field.

13. A terminal, comprising: a processor, a transceiver, and a memory, wherein
the processor is configured to read a program in the memory to:
receive a downlink control channel, and indication information for indicating a division of uplink resources and downlink resources in a time unit;
determine uplink resources and/or downlink resources in a target time unit corresponding to the downlink control channel, according to the indication information,
wherein the target time unit is the time unit in which a target transmission corresponding to the downlink control channel is located; and
determine time field resources of the target transmission corresponding to the downlink control channel in the uplink resources or the downlink resources, and perform the target transmission in the time field resources;
wherein the time unit and the target time unit each is a pre-defined or pre-configured unit comprising one slot;
the processor is configured to read a program in the memory to:
receive the indication information in the target time unit corresponding to the downlink control channel or in a time unit previous to the target time unit;
wherein the indication information is used to indicate resource information of a downlink resource in the target time unit corresponding to the downlink control channel; or to indicate resource information of an uplink resource in the target time unit corresponding to the downlink control channel; or to indicate at least two of: resource information of a downlink resource, resource information of an uplink resource, and resource information of a guard interval GP in the target time unit corresponding to the downlink control channel, wherein the resource information comprises a size and/or a location of the resource; or
the indication information is used to indicate a structure type of the target time unit corresponding to the downlink control channel.

14. The terminal according to claim 13, wherein the target transmission corresponding to one of the following:
the downlink control channel is an uplink shared channel transmission scheduled by the downlink control channel, in a case that a DCI format used by the downlink control channel is an uplink DCI format; the downlink control channel is a downlink shared channel transmission scheduled by the downlink control channel, in a case that a DCI format used by the downlink control channel is a downlink DCI format; or
the downlink control channel is an ACK/NACK feedback corresponding to a downlink shared channel scheduled by the downlink control channel or an ACK/NACK feedback corresponding to the downlink control channel, in a case that a DCI format used by the downlink control channel is a downlink DCI format;
and/or,
the target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

15. The terminal according to claim 13, wherein the processor is configured to read a program in the memory to:
take all symbols or all mini-slots, or all slots or all sub-frames, or a part of symbols or a part of mini-slots, or a part of slots or a part of sub-frames, in the uplink resources or the downlink resources, as the time field resource of the target transmission; or
take all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1; or in a case that an indication field for indicating time field resources of the target transmission exists in the downlink control channel, determining the time field resources of the target transmission in the uplink resources or the downlink resources according to the indication field and the indication information.

16. The terminal according to claim 15, wherein the processor is configured to read a program in the memory to:

a first determining unit configured to: in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, take the time field resources indicated by the indication field as time field resources of the target transmission;

in a case that the time field resources indicated by the indication field exceed a size of the uplink resources or the downlink resources determined according to the indication information, take the uplink resources or the downlink resources as time field resources of the target transmission, or take time field resources indicated by the indication field as time field resources of the target transmission, or take a maximum value or a minimum value of time field resources indicated by the indication field and the time field resources indicated by the uplink resources or the downlink resources as time field resources of the target transmission; and in a case that the time field resources indicated by the indication field exceed a size of an area pre-agreed or pre-configured for data transmission in the uplink resources or the downlink resources which are determined according to the indication information, take the area pre-agreed or pre-configured for data transmission in the uplink resources or the downlink resources as time field resources of the target transmission, or take time field resources indicated by the indication field as time field resources of the target transmission, or take a maximum value or a minimum value of the time field resources indicated by the indication field and the time field resources indicated by the area pre-agreed or pre-configured for data transmission in the uplink resources or the downlink resources as time field resources of the target transmission.

17. The terminal according to claim 13, wherein the processor is configured to read a program in the memory to:

in a case that the indication information is not received or the indication information fails to be received, determine not to perform the target transmission in the target time unit, or determine to perform the target transmission in the target time unit according to a size and/or a location of pre-defined or pre-configured time field resource; or, in a case that an indication field for indicating time field resources of the target transmission exists in the downlink control channel, determine to perform the target transmission in the target time unit according to the time field resources indicated by the indication field.

18. A base station, comprising: a processor, a transceiver, and a memory, wherein:

the processor is configured to read a program in the memory to:

transmit a downlink control channel, and indication information for indicating a division of uplink resources and downlink resources in a time unit;

determine uplink resources and/or downlink resources in a target time unit corresponding to the downlink control channel, according to the indication information, wherein the target time unit is the time unit in which a target transmission corresponding to the downlink control channel is located; and determine time field resources of the target transmission corresponding to the downlink control channel in the uplink resources or the downlink resources, and perform the target transmission in the time field resources;

wherein the time unit and the target time unit each is a pre-defined or pre-configured unit comprising one slot;

wherein the processor is configured to read a program in the memory to:

transmit the indication information in the target time unit corresponding to the downlink control channel or in a time unit previous to the target time unit;

wherein the indication information is used to indicate resource information of a downlink resource in a target time unit corresponding to the downlink control channel; or to indicate resource information of an uplink resource in a target time unit corresponding to the downlink control channel; or to indicate at least two of: resource information of a downlink resource, resource information of an uplink resource, and resource information of a guard interval GP in a target time unit corresponding to the downlink control channel, wherein the resource information comprises a size and/or a location of the resource; or the indication information is used to indicate a structure type of a target time unit corresponding to the downlink control channel.

19. The base station according to claim 18, wherein the structure type comprises at least one of:

a first structure type in which symbols or mini-slots, or slots or sub-frames in the target time unit are all used for an uplink transmission;

a second structure type in which symbols or mini-slots, or slots or sub-frames in the target time unit are all used for a downlink transmission; and a third structure type in which a first part of symbols or a first part of mini-slots, or a first part of slots or a first part of sub-frames in the target time unit are used for an uplink transmission, while a second part of symbols or a second part of mini-slots, or a second part of slots or a second part of sub-frames in the target time unit are used for a downlink transmission.

20. The base station according to claim 18, wherein the target transmission corresponding to one of the following:

the downlink control channel is an uplink shared channel transmission scheduled by the downlink control channel, in a case that a DCI format used by the downlink control channel is an uplink DCI format; the downlink control channel is a downlink shared channel transmission scheduled by the downlink control channel, in a case that a DCI format used by the downlink control channel is a downlink DCI format; or the downlink control channel is an ACK/NACK feedback corresponding to a downlink shared channel scheduled by the downlink control channel or an ACK/NACK feedback corresponding to the downlink control channel, in a case that a DCI format used by the downlink control channel is a downlink DCI format;

and/or, the target time unit is one of: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

21. The base station according to claim 18, wherein the processor is configured to read a program in the memory to:

take all symbols or all mini-slots, or all slots or all sub-frames, or a part of symbols or a part of mini-slots, or a part of slots or a part of sub-frames, in the uplink resources or the downlink resources, as the time field resource of the target transmission; or take all symbols or all mini-slots, or all slots or all sub-frames, or a part of symbols or a part of mini-slots, or a part of slots or a part of sub-frames, in resources pre-agreed or pre-configured for data transmission in the uplink resources or the downlink resources, as the time field resource of the target transmission;

wherein the mini-slot is a unit occupying X symbols, and X is an integer greater than or equal to 1; or in a case that an indication field for indicating time field resources of the target transmission exists in the downlink control channel, determining the time field resources of the target transmission in the uplink resources or the downlink resources according to the indication field and the indication information.

22. The base station according to claim 21, wherein processor is configured to read a program in the memory to:

in a case that the time field resources indicated by the indication field do not exceed a size of the uplink resources or the downlink resources determined according to the indication information, or do not exceed a size of an area pre-agreed or pre-configured for data transmission in the uplink resources or the downlink resources which are determined according to the indication information, take the time field resources indicated by the indication field as time field resources of the target transmission;

in a case that the time field resources indicated by the indication field exceed a size of the uplink resources or the downlink resources determined according to the indication information, take the uplink resources or the downlink resources as time field resources of the target transmission, or take time field resources indicated by the indication field as time field resources of the target transmission, or take a maximum value or a minimum value of time field resources indicated by the indication field and the time field resources indicated by the uplink resources or the downlink resources as time field resources of the target transmission; and in a case that the time field resources indicated by the indication field exceed a size of an area pre-agreed or pre-configured for data transmission in the uplink resources or the downlink resources which are determined according to the indication information, take the area pre-agreed or pre-configured for data transmission in the uplink resources or the downlink resources as time field resources of the target transmission, or take time field resources indicated by the indication field as time field resources of the target transmission, or take a maximum value or a minimum value of the time field resources indicated by the indication field and the time field resources indicated by the area pre-agreed or pre-configured for data transmission in the uplink resources or the downlink resources as time field resources of the target transmission.

23. The base station according to claim 18, wherein the processor is configured to read a program in the memory to:

in a case that the indication information is not transmitted by the terminal or the indication information fails to be transmitted, determine not to perform the target transmission in the target time unit, or determine to perform the target transmission in the target time unit according to a size and/or a location of pre-defined or pre-configured time field resource; or, in a case that an indication field for indicating time field resources of the target transmission exists in the downlink control channel, determine to perform the target transmission in the target time unit according to the time field resources indicated by the indication field.

* * * * *